United States Patent [19]

Jakacki et al.

[11] Patent Number: 4,661,161
[45] Date of Patent: Apr. 28, 1987

[54] READY-MIXED, SETTING-TYPE CEMENTITIOUS COMPOSITION HAVING SEPARATELY PACKAGED ACCELERATOR

[75] Inventors: Edwin J. Jakacki, Buffalo Grove; Larry G. Ogle, Woodstock; Jonathan C. Landwer, Palatine; James C. Andersen, Wildwood, all of Ill.

[73] Assignee: United States Gypsum Company, Chicago, Ill.

[21] Appl. No.: 499,366

[22] Filed: May 31, 1983

[51] Int. Cl.$^4$ .................. C04B 24/14; C04B 11/00
[52] U.S. Cl. .................... 106/112; 106/110
[58] Field of Search .................. 106/109, 110, 112

[56] References Cited

U.S. PATENT DOCUMENTS

| Re. 29,753 | 9/1978 | Williams | 106/115 |
|---|---|---|---|
| 3,035,940 | 5/1962 | Hobson | 106/112 |
| 3,304,189 | 2/1967 | Kuntze | 106/112 |
| 3,598,621 | 8/1971 | Ferrar et al. | 106/112 |
| 3,984,269 | 10/1976 | Schneller et al. | 106/110 |
| 4,157,264 | 6/1979 | Kennedy-Skipton | 106/111 |
| 4,166,751 | 9/1979 | Komeiji et al. | 106/112 |

FOREIGN PATENT DOCUMENTS 53-128631  11/1978  Japan .................. 106/109

Primary Examiner—Gary P. Straub
Attorney, Agent, or Firm—Samuel Kurlandsky; Robert M. Didrick; Robert H. Robinson

[57] ABSTRACT

A setting-type cementitious composition useful for a variety of applications, including, in a preferred embodiment, a joint compound for finishing joints between adjacent gypsum wallboards, comprising a first or cementitious component in pre-mixed form comprising an aqueous slurry of calcium sulfate hemihydrate and a retarder formed of two ingredients, one an organic retarder and the other a retarder which is a chelating agent, and a second or accelerator component comprising an accelerator material preferably in aqueous solution, the first component having an adequately long shelf life suitable for marketing, and, when the cementitious component is mixed with the second component for acceleration, the cementitious mixture acquires excellent application properties maintained throughout a suitable working period. The cementitious component hydrates after a suitable period to form a set material of excellent properties. When utilized as a joint compound, the first or cementitious component additionally includes a non-leveling or thixotropic agent and other ingredients conventionally utilized in joint compound compositions.

21 Claims, No Drawings

READY-MIXED, SETTING-TYPE CEMENTITIOUS COMPOSITION HAVING SEPARATELY PACKAGED ACCELERATOR

BACKGROUND OF THE INVENTION

1. Field of the Invention

The present invention relates to cementitious compositions such as ornamental and casting plasters, molding plasters, spackling compounds, and joint compounds for finishing joints between adjacent gypsum wallboards, and is more particularly concerned with a setting type of joint compound which may be prepared by pre-mixing with water and stored over reasonably long periods of time, and subsequently accelerated prior to application.

2. Description of the Prior Art

The use of drywall or wallboard construction, i.e. a non-plastered surface, has become increasingly popular over the years to the extent that it is estimated that a substantial amount of all new residential and commercial construction is finished in this manner. The usual drywall construction consists of gypsum wallboard panels secured to supporting framing members.

Gypsum wallboard is conventionally made by enclosing a core of an aqueous slurry of calcined gypsum between two paper layers. After the slurry has set and dried, the fabricated sheet is cut and the resulting panels are ready for use. It ordinarily is not practical to make wallboards over four feet wide and about eight to twelve feet in length. As a result there are a considerable number of joints between boards, and these joints must be reinforced and concealed for satisfactory appearance. According to one prior art practice batten strips were applied over the joints for this purpose. This was found to be unsatisfactory as the batten strips tended to accentuate the joints.

In order for wallboard use to be acceptable it is necessary to obtain a smooth finish wall construction similar to that obtained with conventional wet plaster methods. Accordingly, great effort has been made to conceal the joints between the drywall plasterboards or wallboards in order to achieve an overall smooth and continuous wall. To this end, cloth, metal and finally paper tapes have been cemented over the joints between the boards to reinforce the joints, and a finishing coat of cementitious material applied over the tapes to conceal the tape and to provide a smooth surface. The preferred conventional method is to recess the adjoining edges of the gypsum wallboard, apply an adhesive joint compound and embed the paper tape in the joint compound. Several finishing or feathering layers of the joint compound are applied to conceal the tape. Finally, the work is sanded to produce a smooth surface similar to the conventional wet plaster wall.

The adhesives or binding material commonly used in prior art joint compounds were generally based on proteins as the primary binders. Casein or certain refined soya proteins solubilized in water by alkaline materials were used extensively for this purpose. More recent materials are ethylene vinyl acetate and polyvinyl acetate emulsions. When properly blended with fillers such as ground asbestos, mica, clays, limestone, preservatives and thickening agents such as natural gums, a joint compound is obtained which is capable of binding the joint tapes in place and providing a smooth surface. However, this type of joint compound has the disadvantage of requiring extended periods of time to dry.

The conventional procedure for obtaining a good smooth finish is to apply the joint compound in several layers or coats. The first layer is primarily for the purpose of filling the space between the wallboards and for adhering the tape to the adjoining boards. The second layer is applied over the tape to form as smooth and as even a surface as is possible in order to provide a continuous surface coplanar with the board. However, due to shrinkage of the joint compound upon drying and irregularities due to trowelling, etc., a third or finishing layer is generally applied after the second coat has dried.

Due to the necessity for each layer to become substantially dry before the subsequent one can be applied, it is obvious that considerable periods of time are required to achieve an ultimate smooth drywall. Under certain environmental conditions, such as cold, damp weather, days or weeks may be required before the wall is completed. Such delays slow up the construction of a building and delay its eventual sale and occupancy.

Moreover, because of the slow drying of known adhesive type joint compounds shrinkage problems are magnified, contributing further to the difficulty of achieving a smooth wall surface. Shrinkage of the prior art joint compounds upon drying is especially serious when a second coat is applied over an earlier coat which is not completely dried. The areas of the earlier coating which are not thoroughly dry at the time of application of the second coat subsequently shrink, sometimes even after the wall is finished and decorated. Where delayed shrinkage is excessive, it necessitates a return to the job for refinishing and redecorating.

From the foregoing it is apparent that if a joint compound could be made which would set or harden quickly, not only would there be a substantial decrease in the time required for gypsum drywall construction, but, also, there would be less shrinkage. This would indeed represent a significant advance in the art and would greatly reduce the expense and time required for refinishing or redecorating the surfaces of a wall or ceiling.

In order to overcome the disadvantages of the drying type of joint compound, a setting type has been developed in the art. In this type of joint compound, calcined gypsum (calcium sulfate hemihydrate) is utilized as a substantial proportion of the filler material. The compound is prepared in dry powder form and mixed with water when ready for use. The water reacts with the calcium sulfate hemihydrate to form set gypsum or calcium sulfate dihydrate. In this compound the setting time is considerably shorter than the time required for the drying type to dry. This has considerably reduced the time required for preparing a suitable joint. However, the prior art setting type still has the disadvantage that it must be prepared and marketed in dry powder form since, when mixed, it has only a very short usable life and can not be prepared as a ready mixed material in liquid or slurry form as is possible with the drying type.

SUMMARY OF THE INVENTION

Accordingly, it si an object of the present invention to provide setting type cementitious compositions in a retarded state, which compositions can be activated for use by the addition of an accelerator or activator.

It is a further object of the invention to provide a setting type joint compound for use in covering and sealing the joints between adjacent wallboards, wherein the joint compound has a relatively short setting time after the accelerator is added.

It is a further object of the invention to provide a setting type joint compound which can be used for finishing the joints between adjacent wallboards and which, when so used, exhibits comparatively low shrinkage.

It is a primary object of the invention to provide various compositions, including, joint compositions of the setting type which may be pre-mixed in the form of an aqueous slurry having a long shelf life, which slurry can be stored and transported in such form until ready for use.

It is still another object to provide a joint compound of the type described which can be accelerated prior to use, and which, when so accelerated, provides a suitable working time for its application to a joint, and which sets in a relatively short time to form an excellent hardened joint which can be sanded to a smooth finish.

Still further objects and advantages of the invention will appear from the description which follows.

To the accomplishment of the foregoing and related ends, the invention comprises a setting type of cementitious composition and particularly a joint compound having a first component comprising an aqueous slurry of calcium sulfate hemihydrate, conventional joint compound ingredients such as a non-leveling agent and a thickening agent, and a set inhibitor or retarder comprising a combination of a proteinaceous retarder and a chelating agent having retarding properties. The first component has a long shelf life without setting. The second component comprises an accelerator or catalyst, preferably in aqueous solution or suspension, which is separately packaged, and is added to the first component just prior to its intended use to cause the compound to set after a suitable working period. In a preferred form, a conventional polymeric binder is added to provide the joint compound with better adhesive properties, and additionally, to enable it to be used as either a setting or a drying joint compound.

DESCRIPTION OF THE PREFERRED EMBODIMENTS

In designing a ready-mixed, setting-type joint composition several required parameters must be met in order to have a marketable product. First, the composition must exhibit at least a six-week shelf life, that is, it must not undergo hydration of the calcined gypsum before the end of this period or until the accelerator is added. Second, upon addition of an accelerator, a suitable hydration time (set time) must be maintained. Third, the composition must have the physical properties required of a marketable joint treatment system. These parameters are all met by the joint compounds of the present invention.

When compared to the dry powder form of the prior art setting joint composition discussed above, the present composition offers the advantages of reduced mixing time, improved product quality control through elimination of variables associated with mixing and metering at the job site, thereby obviating the need for providing clean mixing water on the job, and thus decreasing the mess and cleanup problems caused by such mixing on the job. Improved slip and less shrinkage, stability and protection from environmental conditions, and decreased damage and contamination with the packaging system are also provided by the invention. While embodying these enumerated additional advantages, the compositions of the present invention still retain all the advantages of a setting type of composition over drying types disclosed in the art. Further, in an improved form, the compositions of the invention may be used either as setting or as drying joint compounds where required by existing conditions.

The ready-mixed joint compound system of the present invention comprises two separate components which are separately packaged. The first component, the cementitious component, must be provided with a long shelf life and comprises an aqueous slurry of calcium sulfate hemihydrate together with retarding, inactivating, or stabilizing agents. It may additionally include conventional ingredients utilized in a joint compound such as clay fillers, non-leveling or thixotropic agents, water retention agents, and preservatives. The retarding, inactivating or stabilizing agent of the invention is a composition comprising a mixture of an organic retarding agent and a retarding agent in the form of a chelating agent. The preferred organic retarding agent is Oakfield Retarder, a proprietary retarder marketed by United States Gypsum Company, and comprises a proteinaceous composition formed from animan tissues. The chelating agent may be any one of those which are effective in chelating calcium ions and demonstrates a retartive effect on the hydration of calcium sulfate hemihydrate. Among the suitable materials are diethylene triamine pentaacetic acid (DTPA), ethylene diamine tetraacetic acid (EDTA), and salts thereof, such as sodium salts, The ingredients of the first component are mixed together with water and packaged. The material may remain in its stabilized, retarded or inactivated condition for 220 days or more.

The second component is an accelerator. Suitable accelerator materials are compounds having ions which have a higher log K value than calcium. Table I below lists a series of metal ions in the order of their log K value measured by use with DTPA which provides values representative of results obtainable with other chelating agents.

TABLE I

| Metal | Log K | | |
|---|---|---|---|
| Iron III | 28.6 | ↑ | Increasing |
| Mercury | 26.7 | ↑ | Metal- |
| Copper II | 21.03 | ↑ | Ligand |
| Nickel | 20.21 | ↑ | Stability |
| Cobalt | 19.00 | ↑ | |
| Cadmium | 18.93 | ↑ | |
| Lead | 18.87 | ↑ | |
| Zinc | 18.14 | ↑ | |
| Iron II | 16.66 | ↑ | |
| Aluminum | 16.00 | ↑ | |
| Manganese | 15.11 | ↑ | |
| Calcium | 10.63 | ↑ | |
| Strontium | 9.68 | ↑ | |
| Magnesium | 9.02 | ↑ | |
| Barium | 8.63 | ↑ | |

As seen in the table, calcium has a log K value of 10.63. Consequently compounds of a metal having a log K value above 10.63 may be utilized. It has been found that both mercury and iron III (ferric) are excellent materials. For this reason mercury cannot be used as a preservative in the cementitious component, as it sometimes is in conventional joint compounds, since it would react readily with the chelating agent. Compounds of ferric ions have been found to be useful materials for use as accelerators. Ferric sulfate has been found to be an excellent material and is utilized in the form of an aqueous solution. Compounds of ferrous ions such as ferrous sulfate and ferrous ammonium sulfate may also be used. Additionally, compounds of aluminum such as aluminum sulfate may be used.

The following examples are provided for illustration and are not to be considered as limiting with regard to the scope of the claims.

In preparing the cementitious or first component of premixed joint compounds according to the invention described in the examples below, water was added to a running mixer. The retarding agents were then added and thoroughly dispersed before any dry powder additions were made. This procedure must be strictly observed or the material may begin to set in the mixer. The preservatives and binder, such as a polymeric latex, were then added to the mixer. Next, the dry ingredients including calcined gypsum and the non-leveling agent were vibrated into the mixer. This step was timed so that it would be completed at the same time as the 90% of total batch water was completely added. Mixing was then continued at this heavy viscosity until the lumps were dissipated and the material appeared to be smooth. The viscosity was then adjusted to the desired Brabender viscosity measurement by mixing in additional water. The material was then ready for testing. A portion of the material was also set aside for shelf life testing.

The second component, the accelerator may be prepared by mixing the accelerator agent, such as an iron or aluminum compound, with water to form an aqueous solution or suspension.

For testing, the aqueous cementitious slurry component of the joint compound was activated by mixing it together with the accelerator. In carrying out this process, the cementitious component was placed in a container having a drill mixer. The material was mixed for about one minute. Clean water at room temperature was then added and mixed into the material until the desired consistency was obtained. The accelerator was then added to a depression formed at the center of the mixing bucket. The two materials were thoroughly mixed together with the drill mixer being moved up and down, and in all corners of the container, until a homogeneous mix was obtained. The material was then ready for testing by forming a joint between two adjacent panels of gypsum wallboard. The accelerator may be prepared for marketing in either the paste, liquid, or dry form.

EXAMPLE 1

A formulation according to the invention was prepared using the method described above and having the composition shown below in Table I:

TABLE I

| | Percent By Weight | Grams |
|---|---|---|
| Alpha calcium sulfate hemihydrate | 39.32 | 1500.00 |
| Beta calcium sulfate hemihydrate | 13.11 | 500.00 |
| Calcium stearate | 0.03 | 1.0 |
| Asbestos fibers | 1.97 | 75.0 |
| Methyl cellulose | 0.16 | 6.15 |
| Polyvinyl chloride | 24.25 | 925.0 |
| Chlormethoxypropyl mercuric acetate | 0.06 | 2.15 |
| Oakfield Retarder | 0.59 | 22.5 |
| Chel-DTPA 41 | 1.47 | 56.25 |
| Sodium citrate | 0.69 | 26.1 |
| H$_2$0 | 18.35 | 700.0 |
| ACCELERATOR PASTE (For 40 ± 10 minutes set time) | | |

TABLE I-continued

| | Percent By Weight | Grams |
|---|---|---|
| Kaolin clay | 37.91 | 1600 |
| Al$_2$(S0$_4$)$_3$ | 28.44 | 1200 |
| Iron oxide pigment | 0.47 | 20 |
| H$_2$0 | 33.18 | 1400 |

In the formulations shown in Table I above, and in Tables II and IV below, the ingredients designated by trademarks are as follows:

Oakfield Retarder is a proteinaceous material derived from animal products such as skin, hoofs and bone, manufactured and marketed by United States Gypsum Company.

Chel-DTPA 41 is a trademarked product comprising a 41% aqueous solution of the pentasodium salt of diethylene triamine pentaacetic acid, marketed by Ciba-Geigy Corporation, Greensboro, N.C.

The cementitious or first component of the joint compound prepared above was tested for shelf life, and exhibited a shelf life of six weeks without spontaneous setting. The material was also tested for freeze-thaw stability, and stability was maintained through twelve cyles. When the accelerator was mixed with the cementitious component, a useable joint compound was formed having a satisfactory working period, and exhibiting all the properties required of a suitable joint compound.

The following examples illustrate formulations utilizing attapulgus clay. Basic joint compound formulations utilizing attapulgus clay are disclosed and claimed in U.S. Pat. No. RE 29,753.

EXAMPLE 2

Utilizing the method described above a joint compound was prepared in two components, one a cementitious slurry and the other an accelerator. The cementitious component formulation is shown below in Table II.

TABLE II

| Raw Materials | Dry Weight % |
|---|---|
| Calcium sulfate hemihydrate | 76.3 |
| Mica | 5.0 |
| Hydroxypropyl methyl cellulose | 0.6 |
| Hydroxyethyl cellulose | 0.2 |
| Talc | 10.0 |
| Attapulgus clay | 3.0 |
| Oakfield Retarder | 0.2 |
| Chel-DTPA 41 | 0.6 |
| Polyvinyl acetate | 4.0 |
| 2[hydroxymethyl] amino] ethanol | 0.05 |
| Tributyltin benzoate | 0.05 |
| Water usage per 2000 g | 990 |

The composition of Example 2 was subjected to a shelf life test, and exhibited a shelf life of 84 days at normal room temperature. The composition samples were also subjected to freeze/thaw cycles in stability tests. After being subjected to three cycles, there appeared to be no change in physicall appearance. However, set times were reduced substantially, from 57 minutes prior to testing, to 14 minutes after the third cycle, for the given amount of accelerator.

The cementitious component prepared above in Example 2 was accelerated for use by mixing with a 50% aqueous solution of ferric sulfate in proportions of 0.3 ml. ferric sulfate solution per 100 g of cementitious component. Listed below in Table III is a chart showing the viscosity of the joint compound during the period of useful application life after acceleration by ferric sulfate.

TABLE III

WORKABILITY OF ACCELERATED
FIRST COMPONENT OF EXAMPLE 2
0.3 ml. of 50% aqueous ferric sulfate
added per 100 g of component

| Time (min.) | Viscosity | Remark (4" Knife Application) |
| --- | --- | --- |
| t = 0 | 520 | Preaddition of catalyst excellent spread. |
| t = 1 | 520 | Excellent spread, no seeds observed (localized hydration). |
| t = 15 | 520 | Excellent spread, no seeds. |
| t = 40 | 570 | Excellent spread with slight body to mass, no seeds. |
| t = 50 | 630 | Still quite good application, no seeds. |
| t = 60 | 690 | Similar to t = 50, no seeds. |
| t = 80 | 1000+ | Viscosity prevents application. |
| t = 87 | | Set. |

EXAMPLE 3

A cementitious or first component of a pre-mixed joint compound was prepared utilizing the method described above. The formulation is shown below in Table IV.

TABLE IV

| Raw Materials | Weight % |
| --- | --- |
| Alpha calcium sulfate hemihydrate | 76.1 |
| Mica | 5.0 |
| Hydroxypropyl methyl cellulose | 0.6 |
| Hydroxyethyl cellulose | 0.2 |
| Talc | 10.0 |
| Attapulgus clay | 3.0 |
| Oakfield Retarder | 0.4 |
| Chel-DTPA (41% aqueous solution) | 0.6 |
| Polyvinyl acetate (emulsion | 4.0 |
| 2[(hydroxymethyl) amino] ethanol | 0.05 |
| Tributyltin benzoate (solution) | 0.05 |

The first component of the joint compound of Example 3 was subjected to the various tests with which the previous joint compounds were tested. The joint compound of Example 3 had improved properties over those of Examples 1 and 2. The "Vicat Set" and freeze/thaw stabilization were considerably improved. The first or cementitious component was tested and was shown to withstand two cycles of freeze/thaw. In addition, the material maintained its original ability to be accelerated to a specific set time. After 118 days the material could still be used but required less accelerator to achieve the desired set time. The first component is also usable as a drying type of joint compound by eliminating the addition of the accelerator and could be so used until about two weeks before it finally hydrates and sets in its container. The accelerator was prepared by forming a solution of 50% by weight ferric sulfate in water and mixing vigorously. The pH of the solution was less than 1. The amount of accelerator utilized may be varied when certain setting periods are required. Table V below is a table of set times obtained through the use of varying amounts of ferric sulfate accelerator in 50% solution used with the formulation shown in Table IV, Example 3.

TABLE V

| Set Time (minutes) | Accelerator per lb. Of material |
| --- | --- |
| 20 | 3.004 ml. |
| 45 | 2.515 ml. |
| 90 | 2.166 ml. |
| 180 | 1.886 ml. |
| 300 | 1.816 ml. |

The chelating agents suitable for use in the present invention are defined by the formula $R_2N$—$(X)$—$NR_2$ wherein X is an aliphatic chain containing at least 3 but not more than 9 carbon atoms, the chain being positioned between the terminal amino groups, and at least 2 R's are selected from the group consisting of lower carboxy acid groups, and the alkali metal, alkaline earth metal, ammonium and triethanolamine salts thereof, the remaining R's are selected from the group consisting of lower alkyl groups and hydrogen atoms. Among the preferred chelating agents are diethylene triamine pentaacetic acid (DTPA) and ethylene diamine tetraacetic acid (EDTA), and salts thereof such as sodium, potassium and calcium salts.

The proteinaceous retarder is a protein hydrolysate conventionally used in the plaster field and marketed by United States Gypsum Company as Oakfield Retarder and by National Gypsum Company as National Retarder.

The amount of proteinaceous retarder such as Oakfield Retarder should be present in the cementitious component in an amount in the range of from about 0.1% to about 0.6% by weight of the overall dry weight of the cementitious component. The chelating agent such as diethylene triamine pentaacetic acid should be present in an amount in a range of from about 0.1% to about 0.6% of the overall dry weight of the cementitious component. The ratio by dry weight between the Oakfield Retarder and the chelating retarding agent should be in the range of from about 5:1 to 1:3 in order to provide a good shelf life. The amounts of the ingredients utilized in the formulation of Example 3 have been found to be optimum.

The pre-mixed joint compound of the present invention has a number of advantages over prior art joint compounds. First, it provides all the advantages of a pre-mixed compound in that it is not necessary to mix a dry powder with water at the site of use, with the attendant problems of wasting time and creating a messy situation in the working area. Second, because the joint compound is a setting type, it sets more quickly than the drying type of joint compound dries, so that a subsequent coating may be applied sooner.

Because the present joint compound additionally contains an organic binder, it may be used either as a setting compound or as a drying compound. Further, because of the precise amounts and relationships of the two ingredients of the added retarder combination, an adequately long shelf life may be obtained. Additionally, the joint compound may undergo several freeze/thaw cycles in storage without impairing its properties or ability to produce proper working results when later mixed with proper amounts of the accelerator for use.

It is to be understood that the invention is not to be limited to the exact details of operation or materials described, as obvious modifications and equivalents will be apparent to one skilled in the art.

Invention is claimed as follows:

1. A group of separately packaged components for preparing a setting-type joint compound for finishing joints between adjacent gypsum wallboards, comprising:
   A. a cementitious component in pre-mixed form comprising an aqueous slurry of calcium sulfate hemihydrate, a non-leveling agent, and a combination retarder comprising a proteinaceous composition formed from animal tissues and a chelating agent selected from the group consisting of ethylene diamine tetraacetic acid, diethylene triamine pentaacetic acid, and salts thereof, said chelating agent having the ability to chelate calcium ions, the ratio between said proteinaceous composition and said chelating agent being in the range of from about 5:1 to about 1:3 by dry weight, and
   B. an accelerator component comprising a compound having a cation with a log K value greater than that of calcium ions and, which, when mixed with said cementitious component, reacts with said chelating agent to release said chelated calcium ions to permit said joint compound to set,
   said cementitious components having a shelf life of at least about 118 days, and, when mixed with said accelerator component, providing a joint compound having a suitable working period, suitable properties including non-levelling properties, and the ability to set to form a good joint between said gypsum wallboards.

2. A joint compound according to claim 1, wherein said proteinaceous composition is present in an amount from about 0.1% to about 0.6%, and said chelating agent is present in a dry weight amount of from about 0.1% to about 0.6% of overall dry weight of said cementitious component.

3. A joint compound according to claim 1, wherein said chelating agent is present in an aqueous vehicle.

4. A joint compound according to claim 1, wherein said chelating agent is diethylene triamine pentaacetic acid or salts thereof.

5. A joint compound according to claim 1, wherein said chelating agent is ethylene diamine tetraacetic acid or salts thereof.

6. A joint compound according to claim 1, wherein said proteinaceous composition is a protein hydrolysate.

7. A joint compound according to claim 1, wherein said accelerator component is ferric sulfate.

8. A joint compound according to claim 1, wherein said calcium sulfate hemihydrate is of the alpha type.

9. A joint compound according to claim 1, wherein said calcium sulfate hemihydrate is of the beta type.

10. A joint compound according to claim 1, wherein said cementitious component additionally contains a thickening agent.

11. A joint compound according to claim 1, wherein said non-leveling agent is attapulgus clay.

12. A joint compound according to claim 11, wherein said proteinaceous composition is present in an amount from about 0.1% to about 0.6%, and said chelating agent is present in an amount of from about 0.1% to about 0.6% of the overall dry weight of said cementitious component.

13. A joint compound according to claim 11, wherein said chelating agent is present in an aqueous vehicle.

14. A joint compound according to claim 11, wherein said chelating agent is diethylene triamine pentaacetic acid or salts throef.

15. A joint compound according to claim 11, wherein said chelating agent is ethylene diamine tetraacetic acid or salts thereof.

16. A joint compound according to claim 11, wherein said proteinaceous composition is a protein hydrolysate.

17. A joint compound according to claim 11, wherein said accelerator component is ferric sulfate.

18. A joint compound according to claim 11, wherein said calcium sulfate hemihydrate is of the alpha type.

19. A joint compound according to claim 11, wherein said calcium sulfate hemihydrate is of the beta type.

20. A joint compound according to claim 11, wherein said cementitious component additionally contains a thickening agent.

21. A joint compound according to claim 1, wherein said accelerator component is a salt having cations selected from the group consisting of ferrous, ferric and aluminum.

* * * * *